Figure 1:
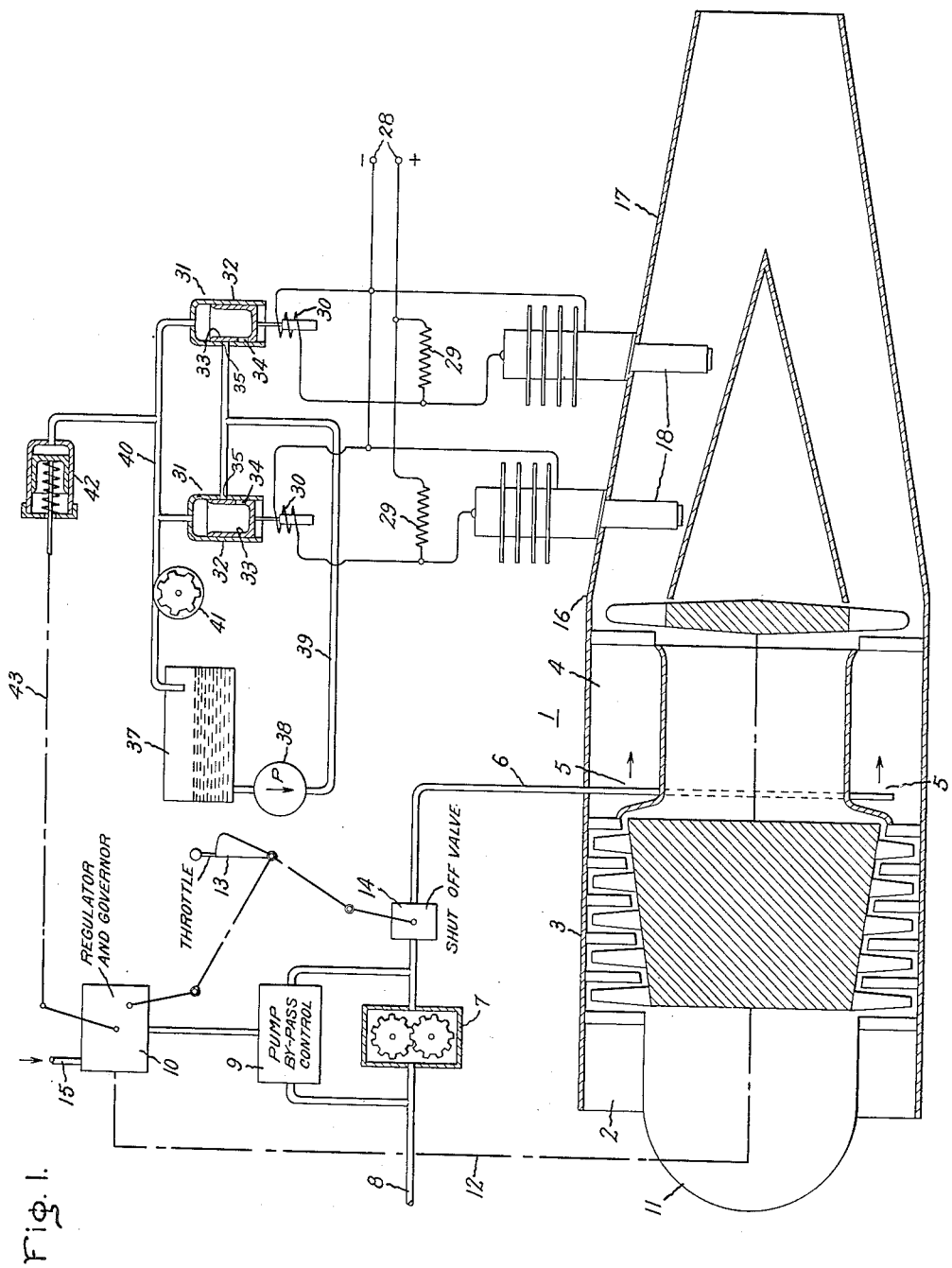

March 11, 1952

R. C. GOODWIN 2,589,074

CONTROL FOR GAS TURBINE POWER PLANTS

Filed Feb. 11, 1950

2 SHEETS—SHEET 1

Inventor:
Ralph C. Goodwin,
by Clande H. Mott.
His Attorney.

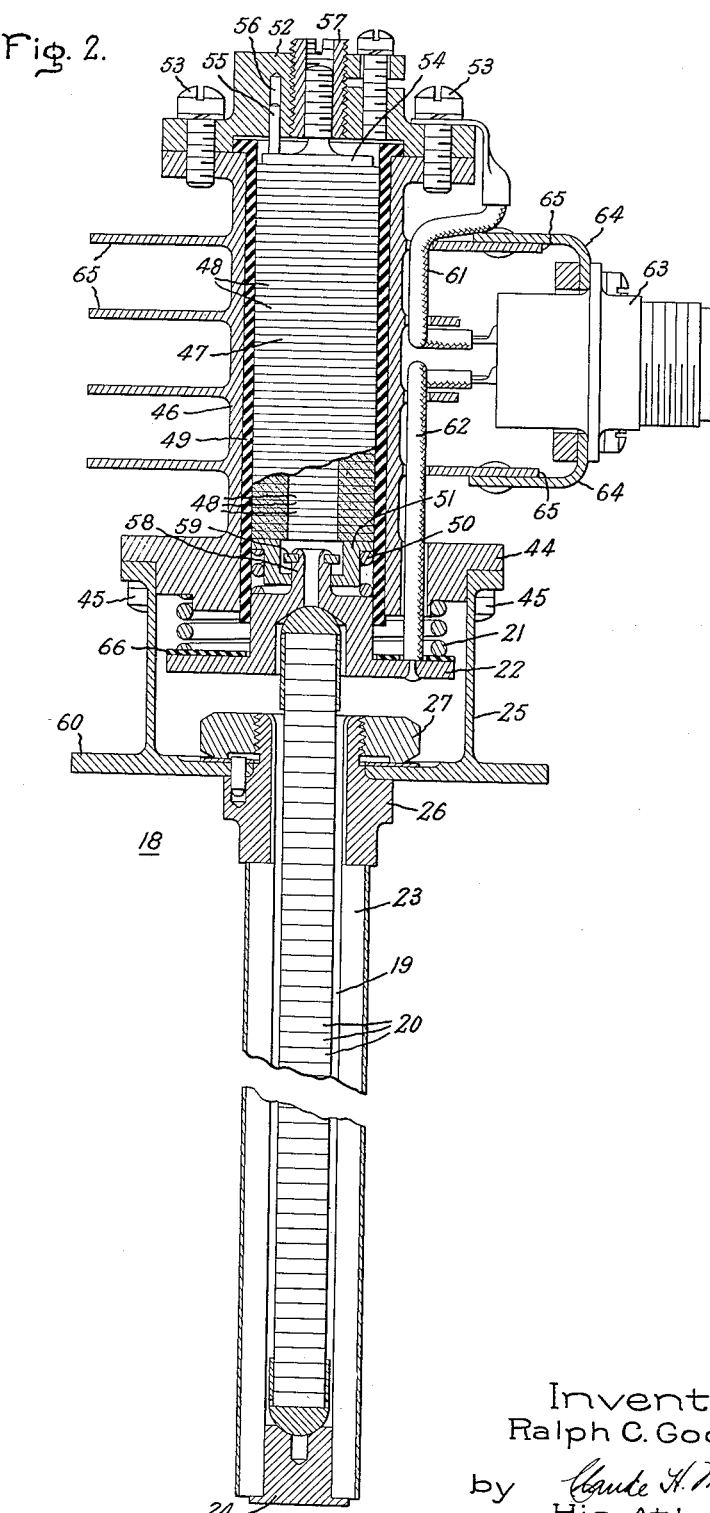

Patented Mar. 11, 1952

2,589,074

UNITED STATES PATENT OFFICE 2,589,074

CONTROL FOR GAS TURBINE POWER PLANTS

Ralph C. Goodwin, Schenectady, N. Y., assignor to General Electric Company, a corporation of New York Application February 11, 1950, Serial No. 143,715

3 Claims. (Cl. 236—84)

This invention relates to a control system for regulating the turbine discharge temperature of an aircraft gas turbine power plant and, more particularly, to such a system employing a combination of electrical and hydraulic control means.

A gas turbine power plant for the propulsion of aircraft may include an air compressor for initially increasing the pressure of the incoming air, combustion apparatus for burning fuel in the compressed air, and a gas turbine arranged in series flow relation with the compression and the combustion apparatus through which the hot, high pressure gas generated by the compressor and combustion apparatus is expanded. The turbine extracts at least sufficient power from these gases to drive the compressor, and the power remaining may be used to produce thrust for propelling the aircraft by discharging the gases exhausted from the turbine rearwardly through a suitable nozzle. Aircraft gas turbine power plants of this type are more particularly described in Patent 2,432,359 to Dale D. Streid, and in application Serial No. 541,565, filed June 22, 1944, of Alan Howard, both assigned to the assignee of the present application.

In a control system of this kind, since the gas turbine is operated at extremely high temperatures, of the order of 1300° F., one of the chief problems is to obtain a temperature detecting device which will withstand such a temperature and at the same time give a very accurate temperature indication. A further problem is to obtain such a high temperature detector which will withstand relatively rapid temperature changes, such as, from ordinary atmospheric, or room temperature, to the high operating temperature mentioned above.

It is, therefore, an object of my invention to provide a control for a gas turbine power plant employing a temperature detection device which is very accurate and which will withstand a large temperature change and the extremely high temperatures incurred in the tail pipe of a gas turbine power plant.

A further problem in regulating the turbine discharge temperature of a gas turbine power plant is that the tail pipe may become disproportionately overheated in particular portions or "hot spots." In this situation, although the "hot spots" may be hot enough to cause serious injury to the power plant and one of the temperature detecting devices may be located at the "hot spot" the control system may be one which responds to an average signal derived from a number of temperature detecting devices in the tail pipe, and the single "hot spot" detector will not increase this average signal enough to avoid injury.

It is, therefore, a further object of my invention to provide a control system for regulating the turbine discharge temperature of a gas turbine power plant wherein the maximum temperature is controlled in response to the temperature detecting device which measures the hottest spot.

My invention, therefore, consists generally in a control system for regulating the turbine discharge temperature of a gas turbine power plant employing thermal differential expansion temperature detectors in the gas turbine tail pipe, electrical resistance units of a resistance variable in response to pressure variations derived from the temperature detector, hydraulic valves respectively actuated in response to signals derived from the resistors and a hydraulic system controlled by the hydraulic valves for regulating a fuel valve of the power plant.

Further objects and advantages of this invention will become apparent and the invention will be better understood by reference to the following description and the accompanying drawings in which Fig. 1 is a schematic illustration of an aircraft gas turbine provided with the improved control system of this invention, and Fig. 2 is a sectional view of the temperature detector and resistance unit structure used in the system of this invention.

Referring more particularly to Fig. 1, there is shown an aircraft gas turbine, generally identified as 1. Air is drawn in at inlet 2 and is compressed by compressor 3. The fuel is introduced in combustion chamber 4 by suitable nozzles 5, which are connected in parallel flow relation to a common fuel manifold 6. The fuel is conveyed to the nozzles 5 by a suitable pump 7 from a fuel supply 8. The output of the pump 7 is modulated by a pump by-pass control 9 which is controlled by a regulator and speed governor mechanism 10. The speed governor portion of the regulator 10 is driven from the gear case 11 of the turbine 1 by a shaft shown schematically at 12. The manual control shaft of the regulator 10 is linked in any suitable manner to the throttle 13. Throttle 13 is also linked to a shut-off valve 14 in the manifold 6.

In gas turbine power plants intended for use at sea level or at a substantially constant altitude, it is a relatively simple matter to supply the fuel requirements of the engine. However, in aircraft service, where the engine is required to operate over a wide range of altitude and where the fuel requirements vary as a function of the altitude, it is desirable to provide compensation to limit the output of the fuel pump in accordance with a preselected function of the atmospheric or some other pressure. Thus, the main fuel regulator 10 is provided with pressure compensation from any desired source, as shown at 15.

After the input air has been compressed by the compressor 3 and heated in the combustion chamber 4, it is expanded through the turbine 16 which drives the compressor 3. The hot gases discharged from the turbine 16 are exhausted through the tail pipe 17 and provide the thrust for propelling the aircraft.

One of the main limitations on the quantity of power which may be produced by a gas turbine power plant of the kind above described, is the temperature at which the turbine 16 may be operated. Although the turbine rotor is built of materials especially selected to withstand high temperatures and high stresses due to the centrifugal forces at high speeds of rotation, excessive temperatures and the excessive speeds accompanying them will cause destruction of the rotor turbine. Turbine discharge temperature detection devices 18 are therefore provided which extend into the tail pipe 17 in the path of the gases which are discharged from the turbine 16. These devices each include a differential expansion unit which may comprise an inner structure having a relatively low coefficient of thermal expansion such as that obtained with a material such as fused quartz, and an outer tubular member surrounding the inner member which is of a material having a relatively high coefficient of thermal expansion. A nickel-chromium alloy is suitable for this purpose. Both the nickel-chromium alloy and the quartz have the attribute that they are capable of withstanding the high temperatures to be anticipated in the tail pipe 17.

Each differential thermal expansion unit protrudes through a suitable opening into the tail pipe 17 and may be fastened in a suitable manner at the exterior of the tail pipe around the opening. Each unit includes a carbon pile, the resistance of which is variable by the thermal expansion elements. Although, for simplicity, only two of these units are shown, it is intended that in a system of this kind, a large number of such units may be used which may be circumferentially spaced around the tail pipe. For greater clarity the units are also shown as larger, with respect to the remainder of the power plant, than they would be in an actual system. These units are more fully described below in connection with Fig. 2.

An electrical circuit for detecting and utilizing the variable carbon pile resistance of each unit is provided which comprises a suitable voltage source 28, a resistor 29 in series with the carbon pile, and a solenoid 30 in parallel with the pile. The carbon pile and resistance 29 divide the voltage of source 28 according to their relative electrical resistances, and the voltage applied to solenoid 30 therefore increases as the carbon pile resistance increases in response to an increase in the turbine discharge temperature.

The solenoids 30 control a hydraulic system by means of associated throttling valves 31, each of which is schematically illustrated as comprising a cylinder 32 and a throttling valve piston 33 having a throttling orifice 34 which cooperates with a cylinder orifice 35. The piston is biased upwardly by the solenoid 30 in accordance with the magnitude of excitation of the associated solenoid, the uppermost piston position opening the valve completely.

The hydraulic system comprises a hydraulic fluid reservoir 37, a pressure pump 38, high pressure connection 39 from the pump to the valves 31, a control pressure conduit system 40 extending away from the outlets of valves 31, a fluid discharge throttling valve 41 and a pressure responsive spring restrained control piston 42 connected to the control pressure conduit. Control piston 42 is connected in a suitable manner, shown schematically at 43, to the turbine fuel regulator 10 to limit the amount of fuel fed to the power plant whenever the maximum allowable tail pipe temperature has been reached as determined at the detectors 18.

The hydraulic system operates as follows. Pump 38 provides a substantially constant fluid pressure in high pressure conduit 39. A variable displacement pump may be used for this purpose in which the displacement is governed according to pump output pressure. If any one of the valves 31 is opened by the operation of the associated solenoid 30, a portion of this hydraulic pressure is transmitted through the valve to the control conduit 40. This control pressure then operates to control piston 42 to reduce the fuel input to the power plant by means of connection 43 to regulator 10 as mentioned above. Control pressure in control pressure conduit 40 is continuously and evenly discharged by a valve 41, and the fluid thus released is returned to reservoir 37. Thus the control pressure is proportional to the opening or openings of valves 31, and if valves 31 close completely, the pressure in the control pressure conduit 40 is released by valve 41, allowing piston 42 to return to the inactive position.

In Fig. 2, thermal expansion unit 18, shown in an enlarged sectional view, reveals an inner structure 19 which comprises a series of flat discs of fused quartz which are stacked together to form a column. The column is kept under compression by means of a spring 21 which transmits a compressive force to the column through a collar 22. Surrounding the column 19 is a nickel chromium metal alloy expansion tube 23 which is normally in tension by reason of the compressive force on column 19. This force is transmitted from the lower end of the column to the tube 23 by means of a plug 24 which closes and seals the end of tube 23. Tube 23 is mounted at the upper end on a casing 25 by means of a threaded terminal member 26 and a nut 27. Casing 25 is closed by means of a flange 44 which is held in place by means of suitable threaded fastenings 45.

Flange 44 forms a part of a second casing 46 housing a carbon pile resistor 47 which is comprised of individual doughnut shaped carbon members 48, some of which are shown in section at the lower end of the pile. Casing 46 is insulated from the carbon pile resistor 47 by means of a suitable insulating tube 49. The individual members 48 of the carbon pile resistor are held together in assembled relationship by means of a spring 50 which is under compression between collar member 22 and a second collar member 51. Casing 46 is closed at the top by a cap member 52 and the pressure exerted on carbon pile 47 by means of compression spring 50 is adjustable by means of an adjustable ram 54. End cap 52 is assembled by means of screws 53.

Ram 54 is restrained from rotation by a pin 55 which fits into a suitable opening 56 in cap 52. The vertical position of ram 54 is adjusted by means of an adjusting sleeve 57 which is threaded on the inner surface for engagement with threads on ram 54 and on the outer surface for threaded engagement with an opening in cap 52. The pitches of these two sets of threads are slightly different, the outer thread being more coarse so that rotation of adjusting sleeve 57 causes a vertical movement of ram 54 in accordance with the difference between the respective pitches of these two threads to give a fine adjustment of the pressure on carbon pile 47. Sleeve 57 is held in the adjusted position by a locking screw 67.

Collar 22 is equipped with a neck portion 58 which protrudes upwardly through a central opening in collar 51 and a flange washer 59 is attached to the upper end of neck 58 by a suitable method such as peening over the upper edge of the neck, flange washer 59 being properly positioned on the neck by a suitable shoulder in the material of neck 58.

The entire unit 18 is attached to a wall of turbine 1, by suitable fastening means at a lower flange 60 on casing 25. The tube 23 and the column of quartz 19 then extend into the heated area. As the area heats up, the tube 23 expands, the column 19 remaining approximately the same length. The column 19, therefore, descends and collar 22 descends with the upper end of this column under the force from spring 21 until the flange 59 engages the central section of collar 51, at which time collar 51 is pulled downwardly to gradually release the pressure exerted on carbon pile 47 by spring 50, thus increasing the resistance of carbon pile 47 in accordance with the increasing temperature detected by the unit. Electrical connections are made from the ends of the carbon pile, by electrical conductors 61 and 62, to a connector receptacle 63 of conventional construction.

Connector 63 is mechanically supported by means of suitable brackets 64 on cooling fins 65 which are provided as an integral part of casing 46 to prevent overheating of the portions of the unit which are not required to be heated. The electrical connections from the carbon pile to the conductors 61 and 62 are established as follows. At the top of the pile the connection is through ram 54, adjusting sleeve 57, and end cap 52 to one of the threaded fastenings 53 and conductor 61. At the lower end of the pile the connection is through collar 51, spring 50, and collar 22. An insulating washer 66 prevents electrical interconnection between collar 22 and end cap 52 through spring 21 and casing 46 so that the ends of the carbon pile are not short circuited.

It will be seen from the above description that this invention provides an improved temperature control for gas turbine power plants wherein maximum temperature may be controlled within narrow limits with a fast control response, and having the particular safety feature of "hot spot" control which avoids localized excessive heating even though the temperatures in other portions of the tail pipe may be within the permissible operating range.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of the invention.

What I claim as new and desire to secure by Letters Patent of the United States is:

1. A system for controlling a gas turbine power plant in accordance with a desired temperature of operation by varying the fuel input, comprising a differential thermal expansion device for detecting variations from the desired temperature, means for converting the differential thermal expansion to derive a pressure variation therefrom, an electrical resistance variable in response to the varying pressure from said means, a source of electrical energy for supplying a voltage across said resistor proportional to the resistance thereof, a solenoid operated fluid control valve connected across said resistor and operable from a closed position to an open position upon increase of said voltage, a hydraulic fluid pressure control system the pressure of which is controlled by the degree of opening of said valve, a spring restrained hydraulic actuator positioned in accordance with the pressure in said system, an input fuel control means controllable in accordance with the position of said actuator.

2. In a system for controlling a gas turbine power plant to prevent excess temperatures in localized portions thereof, a fuel input controller for limiting the fuel flow, a hydraulically controlled piston for actuating said controller, a hydraulic pressure system adapted to move said piston, a plurality of temperature sensing equipments for sensing power plant temperatures and controlling the pressure of said hydraulic system in accordance therewith, each equipment including a differential thermal expansion device comprising a fused quartz column under compression within a nickel chromium metal tube for detecting variations from the desired temperature, a compression spring and a linkage for deriving a pressure variation from said differential thermal expansion device, an electrical carbon pile resistance unit variable in response to said pressure variation, an electrical circuit for supplying a voltage across said unit proportional to the resistance thereof, a solenoid operated fluid control valve connected across said resistance and operable to an open position upon increase of said voltage.

3. In a system for controlling a gas turbine power plant in accordance with a maximum desired temperature of operation by limiting the fuel input, a plurality of differential thermal expansion devices each comprising a fused quartz column under compression within a nickel chromium metal tube for detecting variations from the desired temperature, a compression spring and a linkage for deriving a pressure variation from the differential thermal expansion of each of said devices, electrical carbon pile resistance units variable in response to said pressure variations, an electrical circuit for supplying a voltage across each of said units proportional to the respective resistances thereof, solenoid operated fluid control valves respectively connected across said units, each operable to an open position upon increase of the voltage applied thereto, a hydraulic fluid pressure control system adapted for an increase in pressure by the opening of said valves, a spring restrained hydraulic actuator movable in response to an increase in said pressure, a fuel input controller for limiting the fuel flow in response to movement of said actuator.

RALPH C. GOODWIN.

REFERENCES CITED

The following references are of record in the file of this patent:

UNITED STATES PATENTS

| Number | Name | Date |
| --- | --- | --- |
| 1,913,131 | Sisson | June 6, 1933 |
| 2,377,517 | Ray | June 5, 1945 |
| 2,528,252 | Starkey | Oct. 31, 1950 |

FOREIGN PATENTS

| Number | Country | Date |
| --- | --- | --- |
| 605,093 | Great Britain | July 15, 1948 |